Patented May 27, 1947

2,421,291

UNITED STATES PATENT OFFICE 2,421,291

PRINTING INK

Alfred F. Schmutzler, Boonton, N. J., assignor to Sun Chemical Corporation, a corporation of Delaware No Drawing. Application April 2, 1943, Serial No. 481,594

10 Claims. (Cl. 106—26)

This invention relates to printing inks, and more particularly to inks which are to be set, or "dried" by applying moisture (for example, as water, steam, spray) immediately after printing— such inks being generally referred to as steam or water setting inks.

Such an ink, in its necessary characteristics, presents the conflicting requirements that while it must have sufficient "press stability" so that in use it will distribute readily upon the printing rolls, without setting up or hardening or pulling away from the rolls as a result of pressroom humidity, etc., nevertheless it must be sufficiently responsive to the moisture which is applied after printing so that it will dry or set—i. e., harden to non-offsetting condition—with great rapidity. In fact, to meet the requirements of modern high speed printing presses, such an ink must set almost instantly upon the moisture application.

It is an object of the present invention to provide an improved printing ink adapted for use in the moisture setting process which has press stability at high relative humidities but which can be readily set with great rapidity after printing with the application of moisture (applied, e. g., as water, steam, spray).

It is a further object of the invention to provide such an ink composition comprising a binder component and a solvent component, the solvent component being water-miscible but of such controlled stability characteristics, both as to evaporation and hygroscopicity, as to remain stable and non-hardening on the press but which can nevertheless be set immediately when moisture is applied thereto after printing.

A still further object of the invention is to provide a printing ink composition of the character described in which is utilized a solvent component of controlled hygroscopicity low enough to provide moisture stability on the press, even at high pressroom humidities, and yet so responsive to moisture applied after printing as to permit rapid setting after printing to meet high speed press requirements.

Other objects of the invention will be apparent from the description and appended claims.

In the practising of my invention the components of the ink are such that the imprinted ink will set by the addition of the moisture thereto, but nevertheless the ink has such press stability that it will resist objectionable setting or precipitation by atmospheric moisture even at high relative humidities.

Steam or water setting inks of the kind herein referred to contain a water-insoluble binder component dissolved in a water-miscible solvent component so that upon treatment of the printed impression upon the printed surface with water or steam as described the solvent will be diluted or removed from the binder to such an extent that the binder will be precipitated or set.

Many such water-insoluble binders, which are soluble in water-miscible solvents, although usable to prepare suitable inks for ordinary printing processes, have been found to be completely unsatisfactory for the preparation of steam setting or water setting inks. The reason for this unsatisfactory condition seems to be that water-insoluble binder-water miscible solvent systems are sufficiently sensitive to water absorption so that even slight changes in relative humidity of the atmosphere in which they are used or stored may cause this setting action. For example, when the amount of water vapor in the atmosphere is relatively high, say above 40-50% relative humidity, there is a tendency for such water-insoluble binder-water-miscible solvent systems to absorb moisture from the atmosphere to such an extent as to cause precipitation or setting of the water insoluble binder. Thus when inks which contain such systems are used for printing when the relative humidity of the atmosphere around the press is high there is the objectionable tendency to set and harden on the press, with the result that unsatisfactory or poor prints result. The term "water sensitive" when used in this application with reference to moisture setting inks, means that the ink is more or less subject to deterioration or failure on the press rolls through the action of moisture in the atmosphere, and as a result, the ink fails to remain "open" on the press and either hardens or sets, or fails to follow the printing rolls and to distribute properly thereon, or exhibits some other similar operating failure attributable to absorption of moisture from the atmosphere, in greater or less degree depending upon the nature of the system and the severity of the conditions.

I have now found that if there is utilized as all or part of the solvent or liquid component, in combination with a water insoluble binder, certain esters of polyhydric alcohols, an ink material can be prepared which will retain all the desirable steam setting and water setting characteristics necessary to secure hardening to non-offsetting conditions of the ink when moisture is applied after printing and at the same time the ink system will be extremely resistant on the press before printing to high humidities existing in the pressroom so that it will remain "open"

on the rolls indefinitely or for adequately long periods in press operation under printing conditions even at high relative humidities, up to 85% relative humidity or higher.

Among water-insoluble binders usable in such water or steam setting compositions having extremely rapid water-setting characteristics, excellent gloss and good pigment binding characteristics on printing are the alcohol soluble proteins such as the prolamines, including the corn protein zein, as well as shellac, rosin, ester gum, the maleic acid-terpene resins, the maleic modified rosin glyceride resins, the maleic modified rosin resins, the phenol modified cumar resins, nitrocellulose, cellulose esters and ethers and mixtures thereof. In general, film-forming materials insoluble in water and soluble or dispersible in water-miscible solvents are adequately satisfactory for use in such inks, the particular binder or mixture of binders used depending upon the end characteristics of printed material desired.

Such binders may now be used, according to the invention, to prepare satisfactory steam- or water-setting inks which combine ease of steam- or water-setting with freedom from drying or setting on the presses at high relative humidities, and also with good distribution on the rolls of the printing presses. Also, the inks are stable on the press under conditions of low relative humidity, as for example, when the relative humidity is below about 40%.

In the inks of my invention, there is utilized as all or part of the solvent component in connection with a water-insoluble binder component an ester of a polyhydric alcohol with an organic acid, of suitable boiling point characteristics for the particular press operation. The necessary boiling point characteristics of the solvent materials used will depend to some extent upon the type of press equipment employed, the press speed at which the printing operations are conducted, and the size and nature of the distributing system employed. If a solvent which has too low boiling point is employed, then inks containing such solvent will tend to set or become hard on the rollers or other portions of the distributing mechanism of the press, due to evaporation of the solvent, and the ink will lack the adequate press stability as regards evaporation necessary to secure satisfactory transfer. This characteristic is different from the tendency heretofore set out of so-called moisture-set inks to exhibit characteristics of instability on the press, due to absorption of moisture from the atmosphere into the ink system with consequent objectional setting or precipitation upon the distributing mechanism. As regards the characteristic of evaporation stability in general with letterpress equipment of the type generally in use at the present time, inks of the character described which have a liquid component boiling above 200° C. have been found to be adequately satisfactory. These esters are those in which only one of the hydroxyl groups of the polyhydric alcohol is esterified or in other words in which only one of the groups is attached to, or substituted by an organic acid. That is, the esters which have been found to be adequately effective in preparing inks and ink vehicles of the invention have at least one or more terminal hydroxyl groups. However, in the case of organic acids having more than one acid group either one or all of the reactive (acid) groups of the acid may be attached to an alcohol, so that the esters comprise those in which there is one acid residue attached to one or more ester-alcohol groups. Illustrative examples of compounds which are suitable for use as solvents in the inks and ink vehicles of the invention include di-(ethylene glycol) mono-maleate, di-(ethylene glycol) mono-phthalate, di-(diethylene glycol) mono-oxalate, mono-(ethylene glycol) mono-phthalate, mono-(diethylene glycol) mono-maleate, di-(ethylene glycol) mono-crotonate and mono-(diethylene glycol) mono-adipate.

Esters prepared from other polyhydric alcohols such as other polyglycols, e. g., triethylene glycol, tetraethylene glycol, can also be used, and can be coupled with other suitable aliphatic or aromatic or heterocyclic acids such as tartaric, succinic, citric, malic, adipic, etc., to produce solvents of adequately effective moisture-stability characteristics effective for use in the moisture setting inks and ink vehicles of the invention.

For illustrative purposes, several examples are hereinafter given of inks which contain ink vehicles comprising water-insoluble binder-water-miscible solvent systems of the invention. It will be understood that in the examples given, the particular proportions of water-insoluble binder material, water-miscible solvent and pigments are not critical, but may be varied to meet the particular conditions required for press, operating or printing speed, and paper as customarily is done in the printing industry, as well understood by those skilled in the art. Further, the particular coloring material, pigment and dyestuff if desired may, of course, be varied to suit the color requirements of any particular printing job or operation. The inks described are prepared by the conventional mixing and grinding operations well known to the ink industry. The vehicles are prepared by dissolving or dispersing the water-insoluble binder component in the liquid component in the cold, or by gentle warming, as is customary in preparing such types of ink vehicles.

*Example I*

|  | Parts by weight |
|---|---|
| Resin [1] | 31.2 |
| Di-(diethylene glycol) mono-phthalate | 53.2 |
| Carbon black | 15.6 |
|  | 100.0 |

*Example II*

|  | Parts by weight |
|---|---|
| Resin [1] | 31.2 |
| Di-(ethylene glycol) mono-phthalate | 53.2 |
| Carbon black | 15.6 |
|  | 100.0 |

*Example III*

|  | Parts by weight |
|---|---|
| Resin [1] | 31.2 |
| Di-(diethylene glycol) mono-maleate | 53.2 |
| Carbon black | 15.6 |
|  | 100.0 |

[1] The resin in these examples was a fused mixture of resin 40 parts, shellac 20 parts and 100% phenol-aldehyde resin 40 parts.

The inks of Examples I to III were printed, using a commercial proof press on a day when the relative humidity was 73% in the pressroom—and were tested in direct comparison with an ink of the same composition in which diethylene glycol a commonly employed solvent in heretofore available commercial steam- or water-setting inks, was used as the entire solvent component in place of the solvents of the present invention.

The ink containing only the diethylene glycol would not distribute on the rolls and failed to yield even a single print. Example I printed satisfactorily under the above conditions for 10 minutes; Example II printed satisfactorily for more than 25 minutes; while Example III was run for an hour, and was still printing well when printing operations discontinued after that time.

*Example IV*

| | Parts by weight |
|---|---|
| Hard phenol-indene-cumarone resin | 26.6 |
| Di-(ethylene glycol) mono-oxalate | 53.4 |
| Carbon black | 20.0 |
| | 100.0 |

The example given above, and others using di (ethyleneglycol) monophthalate; di (ethylene glycol) mono-maleate and diethylene glycol mono-crotonate as the solvent in conjunction with the phenol-indene-cumarone resin were run on a printing press in comparison with a similar ink using the same resin, but with diethylene glycol as the solvent. Even at a relative humidity of 50%, the diethylene glycol ink failed to produce a single satisfactory print, the first proofs being mottled and unsatisfactory, and complete failure to print or transfer from the printing plate to the paper stock occurring in 6 minutes.

The ink using di-(ethylene glycol) monophthalate and di-(diethylene glycol) mono-oxalate printed satisfactorily for about 25 minutes when they began to increase in tack but continued to print and distribute well. The inks containing the di-(diethylene glycol) mono-maleate and the di-ethylene glycol mono-crotonate yielded good proofs on printing over a period of 30 minutes and were still printing satisfactorily at the end of this period, showing no indication of a breakdown.

*Example V*

| | Parts by weight |
|---|---|
| 100% phenol-aldehyde resin | 16.4 |
| Di-(diethylene glycol) mono-maleate | 63.6 |
| Carbon black | 20.0 |
| | 100.0 |

This ink was likewise compared for printing qualities with an ink using the same resin and pigment but with di-ethylene glycol as the solvent, printing being done in a pressroom in which the relative humidity was 50%. The di-ethylene glycol ink failed after 2 minutes of distribution on the press rolls, the ink caking up so badly that no satisfactory print could be obtained. The ink of Example V gave satisfactory printed proofs for 90 minutes under the same conditions and was still operating satisfactorily when the test was discontinued after that time.

*Example VI*

| | Parts by weight |
|---|---|
| Maleic-rosin-glyceride resin | 28.5 |
| Di-(diethylene glycol) mono-oxalate | 51.5 |
| Carbon black | 20.0 |
| | 100.0 |

This ink when tested by printing in comparison with a diethylene glycol ink using the same resin under conditions of relative humidity of about 53% showed the characteristic moisture- and evaporation stability as compared to the diethylene glycol ink, printing satisfactorily for 25 minutes, whereas the diethylene glycol ink failed after 8 minutes.

*Example VII*

| | Parts by weight |
|---|---|
| Rosin | 40.0 |
| Diethylene glycol mono-crotonate | 40.0 |
| Carbon black | 20.0 |
| | 100.0 |

This ink, printed under pressroom humidities of about 47% relative humidity against a diethylene glycol ink using rosin binder was stable on the press for 15 minutes whereas the diethylene glycol ink did not distribute well on the press and no satisfactory proof could be obtained after 2 minutes on the press.

*Example VIII*

| | Parts by weight |
|---|---|
| Ester gum | 38.8 |
| Diethylene glycol mono-crotonate | 41.2 |
| Carbon black | 20.0 |
| | 100.0 |

This ink operated satisfactorily on the press when the relative humidity of the pressroom was about 47% for 15 minutes, while a similar ester gum-diethylene glycol ink would not distribute at all on the rolls, and no satisfactory prints could be obtained.

*Example IX*

| | Parts by weight |
|---|---|
| Zein | 14.0 |
| Di-(diethylene glycol) mono-oxalate | 69.0 |
| Carbon black | 17.0 |
| | 100.0 |

This ink was stable and remained open on the distributing rolls of a press for more than an hour in a pressroom whose relative humidity as measured at the time of test with the above described ink was 82%.

When the imprinted inks of Examples 1 to 9 are treated, after printing, with applied moisture—and such can satisfactorily be accomplished by application of water, steam or spray to the imprinted material—the inks "set"—i. e., harden to non-offsetting condition—with great rapidity, and show no tendency to objectionable smearing or smudging.

From the foregoing, it is seen that the inks of the invention possess outstanding characteristics in use which make them astonishingly well suited for application in which setting or drying of the imprinted ink is accomplished by applying moisture after printing. The inks of the invention have exceptional press stability and under even such extreme pressroom humidity conditions as 85% relative humidity, or higher, such inks may be provided which do not deteriorate or set on the press rolls or fail to follow the printing rolls or distribute properly thereon due to the effect or absorption of moisture from the atmosphere with consequent precipitation of the binder material. Nevertheless such inks possess the important characteristic of setting almost instantly to hard non-offsetting films when moisture is applied to the imprinted ink after printing. Thus, the inks of the invention can be used under low humidity conditions of pressroom, as for example below 40% relative humidity, and also under pressroom conditions of high humidity, for example above 40-50% relative humidity and even up to 90% relative humidity with satisfactory results for press stability, during press operations, printability, and setting of the imprinted ink as described. While the illustrative examples given show the utility of the inks of the invention under conditions of high relative humidity, such inks are also completely satisfactory with reference to press stability during press operations, printability and setting of the imprinted ink under low relative humidity conditions. And the comparative tests show the astonishingly great superiority of the solvents of this invention used with various binders as compared with a solvent typical in its responsiveness to solvents used by others in commercial inks of this type.

While the compositions described constitute the preferred embodiments of the invention, it is to be understood that the invention is not limited to such precise embodiments and that changes may be made therein without departing from the scope of the invention as described and defined in the appended claims.

What is claimed is:

1. A printing ink vehicle characterized by superior press stability whereby said vehicle remains open on the ink distributing rolls and inking mechanism of a press under conditions of high relative atmospheric humidity ranging up to 90 per cent relative humidity and capable of being set to non-offsetting conditions by application of moisture after printing, comprising a water-insoluble binder material above 16% and up to about 50% and a water-miscible liquid component compatible therewith and within the range of approximately 50–84%, said liquid component boiling above 200° C., and said liquid component consisting essentially of an organic carboxylic acid ester of a glycol in which only one of the hydroxyl groups of the glycol is esterified and in which the other of said groups remains as a terminal hydroxyl group.

2. A printing ink, characterized by superior press stability whereby said ink remains open on the ink distributing rolls and inking mechanism of a press under conditions of high relative atmospheric humidity ranging up to 90 per cent relative humidity and capable of being set to non-offsetting conditions by application of moisture after printing, comprising a coloring material, a water-insoluble binder material above 13% and up to about 40% and a water-miscible liquid component compatible with said binder material and within the range of approximately 40–70%, said liquid component consisting essentially of an organic carboxylic acid ester of a glycol in which only one of the hydroxyl groups of the glycol is esterified and in which the other of said groups remains as a terminal hydroxyl group.

3. A printing ink, characterized by superior press stability whereby said ink remains open on the ink distributing rolls and inking mechanism of a press under conditions of high relative atmospheric humidity ranging up to 90 per cent relative humidity and capable of being set to non-offsetting conditions by application of moisture after printing, comprising a coloring material, a nitrocellulose about 13% and up to about 40% and approximately 40–70% of a water-miscible liquid component compatible with said nitrocellulose, said liquid component consisting essentially of an organic carboxylic acid ester of a dihydric alcohol in which only one of the hydroxyl groups of the dihydric alcohol is esterified and in which the other of said groups remains as a terminal hydroxyl group.

4. A printing ink vehicle characterized by superior press stability, whereby said vehicle remains open on the ink distributing rolls and inking mechanism of a press under conditions of high relative atmospheric humidity ranging up to 90% relative humidity and capable of being set to non-offsetting conditions by application of moisture after printing, comprising a water-insoluble resinous binder material above 16% and up to about 50% and a water-miscible liquid component compatible therewith and within the range of approximately 50–84%, said liquid component boiling above 200° C. and said liquid component consisting essentially of an organic carboxylic acid ester of a dihydric alcohol in which only one of the hydroxyl groups of the dihydric alcohol is esterified and in which the other of said groups remains as a terminal hydroxyl group.

5. A printing ink vehicle characterized by superior press stability, whereby said vehicle remains open on the ink distributing rolls and inking mechanism of a press under conditions of high relative atmospheric humidity ranging up to 90% relative humidity and capable of being set to non-offsetting conditions by application of moisture after printing, comprising a prolamine above 16% and up to about 50% and a water-miscible liquid component compatible therewith and within the range of approximately 50–84%, said liquid component boiling above 200° C. and said liquid component consisting essentially of an organic carboxylic acid ester of a dihydric alcohol in which only one of the hydroxyl groups of the dihydric alcohol is esterified and in which the other of said groups remains as a terminal hydroxyl group.

6. A printing ink vehicle characterized by superior press stability, whereby said vehicle remains open on the ink distributing rolls and inking mechanism of a press under conditions of high relative atmospheric humidity ranging up to 90% relative humidity and capable of being set to non-offsetting conditions by application of moisture after printing, comprising nitrocellulose above 16 and up to about 50% and a water-miscible liquid component compatible therewith and within the range of approximately 50–84%, said liquid component boiling above 200° C. and said liquid component consisting essentially of an organic carboxylic acid ester of a dihydric alcohol in which only one of the hydroxyl groups of the dihydric alcohol is esterified and in which the other of said groups remains as a terminal hydroxyl group.

7. A printing ink characterized by superior press stability, whereby said ink remains open on the ink distributing rolls and inking mechanism of a press under conditions of high relative atmospheric humidity ranging up to 90% relative humidity and capable of being set to non-offsetting conditions by application of moisture after printing, comprising a coloring material, a water-insoluble resinous binder material above 13% and up to about 40% and a water miscible liquid component compatible with said binder material and within the range of approximately 40–70%, said liquid component consisting essentially of an organic carboxylic acid ester of a dihydric alcohol in which only one of the hydroxyl groups of the dihydric alcohol is esterified and in which the other of said groups remains as a terminal hydroxyl group.

8. A printing ink characterized by superior press stability, whereby said ink remains open on the ink distributing rolls and inking mechanism of a press under conditions of high relative atmospheric humidity ranging up to 90% relative humidity and capable of being set to non-offsetting conditions by application of moisture after printing, comprising a coloring material, a prolamine above 13% and up to about 40% and a water-miscible liquid component compatible with said prolamine and within the range of approximately 40-70%, said liquid component consisting essentially of an organic carboxylic acid ester of a dihydric alcohol in which only one of the hydroxyl groups of the dihydric alcohol is esterified and in which the other of said groups remains as a terminal hydroxyl group.

9. A printing ink characterized by superior press stability, whereby said ink remains open on the ink distributing rolls and inking mechanism of a press under conditions of high relative atmospheric humidity ranging up to 90% relative humidity and capable of being set to non-offsetting conditions by application of moisture after printing, comprising a coloring material, above 13% and up to about 40% of a water-insoluble binder material, and approximately 40-70% of a water-miscible liquid component compatible therewith, said liquid component consisting essentially of an organic carboxylic acid ester of a dihydric alcohol in which only one of the hydroxyl groups of the dihydric alcohol is esterified and in which the other of said groups remains as a terminal hydroxyl group, said liquid component boiling above 200° C.

10. A printing ink characterized by superior press stability, whereby said ink remains open on the ink distributing rolls and inking mechanism of a press under conditions of high relative humidity and capable of being set to non-offsetting conditions by application of moisture after printing, comprising a coloring material, a water-insoluble binder material above 13% and up to about 40% and a water miscible liquid component compatible therewith and within the range of approximately 40-70%, said liquid component consisting essentially of an organic carboxylic acid ester of a dihydric alcohol in which only one of the hydroxyl groups of the dihydric alcohol is esterified and in which the other of said groups remains as a terminal hydroxyl group, said liquid component boiling above 200° C.

ALFRED F. SCHMUTZLER.

REFERENCES CITED

The following references are of record in the file of this patent:

UNITED STATES PATENTS

| Number | Name | Date |
|---|---|---|
| 2,244,103 | Erickson et al. | June 3, 1941 |
| 2,157,385 | Gessler et al. | May 9, 1939 |
| 1,922,646 | Van Schaack et al. | Aug. 15, 1933 |
| 2,285,183 | Bernardi | June 2, 1942 |
| 2,158,481 | Hansen et al. | May 16, 1939 |
| 2,115,716 | Hansen | May 3, 1938 |
| 2,361,009 | Carman et al. | Oct. 24, 1944 |
| 2,346,969 | Jeuck et al. | Apr. 18, 1944 |
| 2,335,882 | Pingarron | Dec. 7, 1943 |

FOREIGN PATENTS

| Number | Country | Date |
|---|---|---|
| 456,898 | Great Britain | Nov. 17, 1936 |
| 337,199 | Great Britain | Oct. 30, 1930 |
| 468,384 | Great Britain | July 2, 1937 |